United States Patent [19]

Jones et al.

[11] 4,354,387

[45] Oct. 19, 1982

[54] APPARATUS IDENTIFICATION SYSTEM

[75] Inventors: William R. Jones; Edgar F. Harrington, both of Houston, Tex.

[73] Assignee: National Identification Bureau Inc., Houston, Tex.

[21] Appl. No.: 298,152

[22] Filed: Aug. 31, 1981

Related U.S. Application Data

[63] Continuation of Ser. No. 136,388, Apr. 1, 1980, Pat. No. 4,309,904.

[51] Int. Cl.³ .......................................... G01N 29/00
[52] U.S. Cl. .................................................... 73/597
[58] Field of Search .................... 73/597, 602; 209/590

[56] References Cited

U.S. PATENT DOCUMENTS 4,003,244  1/1977  O'Brien et al. ...................... 73/597

FOREIGN PATENT DOCUMENTS 1241287  8/1971  United Kingdom .................. 73/602

OTHER PUBLICATIONS

S. J. Crutzen et al., "Application of Tamper-Resistant Identification and Sealing Techniques for Safeguards", IAEA-SM-201/5, pp. 305-338.

Primary Examiner—Stephen A. Kreitman
Attorney, Agent, or Firm—Arnold, White & Durkee

[57]  ABSTRACT

A system for coding and identifying an article is provided wherein a plurality of pellets are secured to the article. The pellets are each constructed from a known material and the thickness of the pellets vary. Each pellet may be identified by the measurement of the time that it takes for a known traveling wave, e.g. an ultrasonic wave, to pass through it.

10 Claims, 2 Drawing Figures

APPARATUS IDENTIFICATION SYSTEM

This is a continuation of application Ser. No. 136,388, filed Apr. 1, 1980, now U.S. Pat. No. 4,309,904.

BACKGROUND OF THE INVENTION

1. Field of the Invention

The present invention relates to identification systems for articles, and, more particularly, it relates to a system for coding for identification an article such as a piece of machinery.

2. Description of the Prior Art

There are several advantages to coding an article such as machinery for later identification. These advantages include providing a means to trace and identify the article if it should be stolen or simply providing a means to inventory articles for record-keeping purposes.

In the past, articles have commonly been coded for identification by etching, engraving, or in some other way placing upon the article a serial number for future reference. With this method, however, the serial number may be easily removed or altered if its location may be readily ascertained. Further, the serial number may often be accidentally removed through normal use during operations or during repairs. Accordingly, it is desirable to provide a means for identification for an article, the location of which may be concealed, if desired, and which may not be readily removed, even if its location is determined.

SUMMARY OF THE INVENTION

In accordance with the present invention, a system for coding and identifying an article is provided wherein the system comprises a plurality of pellets secured to the article. The pellets are each constructed from a known material and the thickness of the pellets vary. Each pellet may be identified by the measurement of the time that it takes for a known traveling wave, e.g. an ultrasonic wave, to pass through it.

In accordance with the present invention, a method of coding and identifying an article is also provided. The method includes securing a plurality of pellets to the article wherein the pellets are constructed from a known material and have varying thicknesses. Traveling waves having known properties are then passed through each pellet and the time of travel of the respective traveling waves through the respective pellets is measured to indicate the thickness of each pellet.

In a specific embodiment of the present method, each pellet is secured such that there exists an air pocket between the pellet and the article wherein the air pocket acts to reflect the traveling wave back through the pellet. The method is then characterized by measuring the time of travel through the pellet of a reflected traveling wave.

In an additional aspect of the present method, each pellet essentially consists of the same material. The time measurement of the traveling wave through the respective pellets thereby identifies the thickness of the respective pellet.

DESCRIPTION OF SPECIFIC EMBODIMENTS

It will be appreciated that the present invention can take many forms and embodiments. Some embodiments of the invention are described so as to give an understanding of the invention. It is not intended, however, that the illustrated embodiments herein described should in anyway limit the true scope and spirit of the invention.

Additionally, while the present system comprises a plurality of pellets, only one pellet will be illustrated, it being understood that the description applies to each of the pellets.

Figure 1:
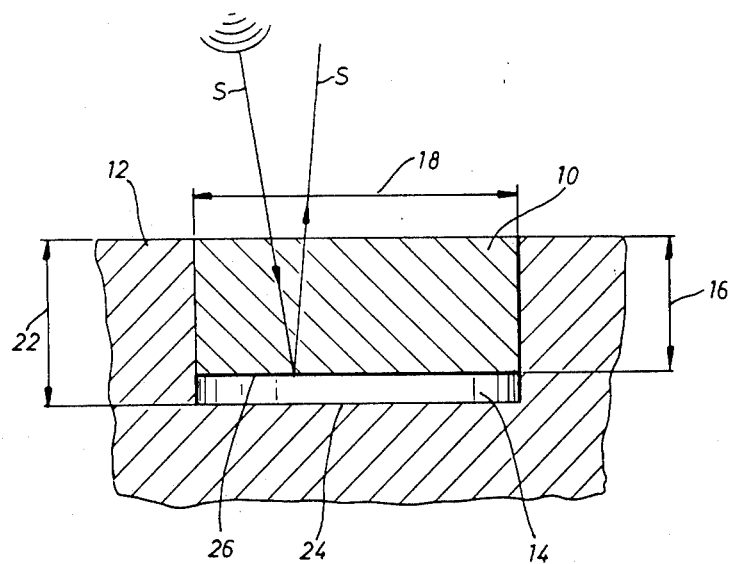
FIG. 1 is a cross-sectional view of a cutaway of an article with a pellet in place in accordance with the present invention.
Figure 2:
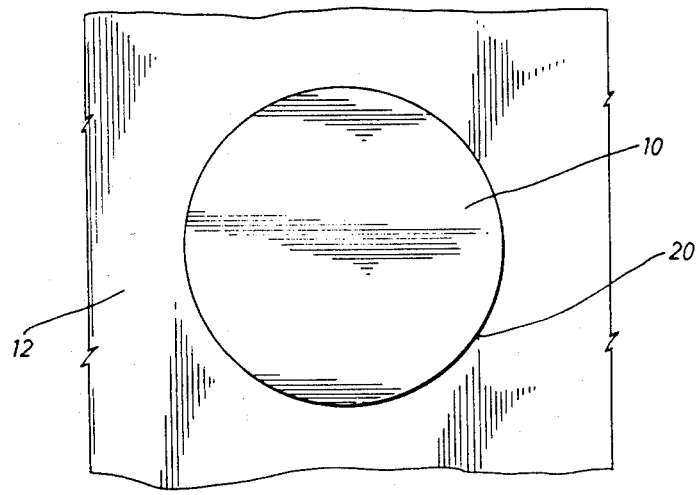
FIG. 2 is a top view of the device illustrated in FIG. 1.

Referring now to FIG. 1, the identification system is generally represented by pellet 10 secured to an article 12 adjacent to a reflecting medium 14. Pellet 10 essentially consists of any material for which a traveling wave S displays a consistent behavior when passing through it. In the preferred embodiment, the pellets 10 are comprised of various metals or alloys of metals such as alluminum, copper, silver, stainless steel, brass, lead, nickel, tin or zinc. It should be understood, however, that other materials having a suitable internal structure such that traveling waves exhibit regular behavior when passing therethrough may be utilized in accordance with the present invention.

The pellet 10 may have any suitable configuration having a single dimension which may be readily determined by the passage of a traveling wave S therethrough. In the preferred embodiment, the pellet 10 comprises an essentially flat, disc-shaped member having a diameter 18 and a thickness 16, wherein the thickness 16 is substantially constant for an individual pellet 10, thereby providing the dimension to be measured for that pellet. The thickness 16 may vary, however, between different pellets 10 utilized on the same article 12. In the preferred embodiment, the thickness 16 may vary for different pellets from 0.040 inches and 0.090 inches.

The pellet 10 may be secured to the article 12 next to a reflecting medium 14 such that the reflecting medium 14 reflects a traveling wave S passing through the pellet 10 back through the pellet 10 to pass out the same side as the traveling wave S originally entered. In the preferred embodiment, an aperture 20 is provided in the article 12 of diameter substantially equal to or slightly greater than the diameter 18 of the pellet 10. The pellet 10 is then secured to the article 12 by press fitting the pellet 10 into the aperture 20 such that the pellet 10 is flush with the surface of the article 12. Additionally, in the preferred embodiment, the depth 22 of the aperture 20 is slightly greater than the thickness 16 of the pellet 10 such that upon the flush insertion of the pellet 10 into the aperture 20, a compressed air pocket 14 exists between the bottom 24 of the aperture 20 and the lower side 26 of the pellet 10. The compressed air pocket 14 thereby functions as the reflecting medium to reflect the traveling waves S passing through the pellet 10.

While in the preferred embodiment, an air pocket is utilized as the reflecting medium, it should be understood that other substances suitable to act as a reflecting medium to traveling waves may be utilized in accordance with the present invention. It is only important that the pellet 10 be secured to the article 12 such that an accurate time measure of a traveling wave passing through it may be obtained.

Accordingly, when the present invention is utilized, a plurality of pellets 10 are secured to an article 12 flush with the surface as described above. The flush embedding of the pellets 10 enables the pellets to be painted over in order to conceal their location if desired. A traveling wave S having known characteristics is then propagated and passed through the pellet 10 and the time required for the wave to go through the pellet 10 is measured. The time data is then interpreted in view of the material through which the wave passed by means which are known to those of skill in the art in order to determine the thickness 16 of the pellet 10.

In the preferred embodiment, an ultrasonic measuring device such as is known to those of skill in the art is utilized to measure the thickness 10. It should be understood, however, that other measuring devices capable of propagating measurable traveling waves may be utilized in accordance with the present invention.

In a specific embodiment, an article may be coded by three pellets consisting of a known material such as stainless steel which vary in width. That is, the first pellet may have a width of 0.040 inches, the second pellet may have a width of 0.080 inches, and the third pellet may have a width of 0.060 inches. The article would then have a code of "0.040-0.080-0.060".

In an additional interrelationship wherein a manufacturer has several pieces of machinery which it wishes to code, the system may include pellets having a consistent pattern of varying thicknesses followed by pellets having no pattern of varying thicknesses. The non-consistent pellets would then be the factor providing flexibility of identification. For example, one embodiment may include a system wherein every first pellet is 0.040 inches thick, every second pellet is 0.080 inches thick, and every third pellet is 0.060 inches thick for articles marked by a single entity. The thicknesses of additional pellets may then be varied to distinguish between the articles for that entity.

Additionally, in another alternative embodiment, the geometric configuration in which the pellets are secured to the article may be varied. For example, four pellets may be secured to an article in the shape of a square or trapezoid wherein the pellets are also varied in thickness as described above. The number of pellets may further be increased or decreased to accomodate other geometric patterns.

It should be now understood that the number of pellets and the thicknesses of the pellets may be increased or decreased as desired in accordance with the present invention.

From the foregoing, it will be apparent to those skilled in the art that other variations of the illustrated embodiments may be made without departing from the spirit and scope of the invention. For example, the pellets may be secured such they are not flush with the surface of the article so that their location may be more readily determined if desired. Additionally, the shape of the pellet could be varied with there being a corresponding change in the shape of the aperture in the article or a corresponding change in the means for suitably securing the pellet. Also, the pellets may be secured to the article such that each pellet has a different location on the article. These and other variations would be apparent to those skilled in the art and are within the spirit and scope of the invention.

What is claimed is:

1. A system for coding and identifying an article, comprising a plurality of pellets selectively secured to the article such that they may be identified by a time measurement of traveling waves having known characteristics passing through the pellets, said pellets having a selected material and thickness interrelationship.

2. The system of claim 1 further comprising a plurality of pellets having a selected pattern of varying thicknesses.

3. The system of claim 1 or 2 wherein said pellets are secured such that there exists an air pocket between the pellet and the article for reflecting a traveling wave for measurement.

4. The system of claim 1 including a reflecting surface positioned between the pellet and such an article for reflecting a traveling wave passing through said pellet.

5. The system of claim 4 wherein the pellets are embedded flush with the surface of such an article in order to accommodate concealment of the pellets.

6. The system of claim 5 further comprising a plurality of pellets having a selected pattern of varying thicknesses.

7. The system of claim 4 further comprising a plurality of pellets having a selected pattern of varying thicknesses.

8. The system of claim 1 wherein the pellets are embedded flush with the surface of such an article in order to accommodate concealment of the pellets.

9. The system of claim 8 further comprising a plurality of pellets having a selected pattern of varying thicknesses.

10. The system of claims 8 or 9 wherein said pellets are secured such that there exists an air pocket between the pellet and the article for reflecting a traveling wave for measurement.

* * * * *